United States Patent
Cui et al.

(10) Patent No.: US 12,554,546 B1
(45) Date of Patent: Feb. 17, 2026

(54) PHASED SERVER RESERVATION WITH A SERVER LEVEL ALLOCATION AND AN ALLOTMENT LEVEL ALLOCATION

(71) Applicant: Meta Platforms, Inc., Menlo Park, CA (US)

(72) Inventors: Yan Cui, Newark, CA (US); Zhoutong Jiang, Sunnyvale, CA (US); Xiang Li, Santa Clara, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 603 days.

(21) Appl. No.: 17/958,270

(22) Filed: Sep. 30, 2022

(51) Int. Cl.
*G06F 9/46* (2006.01)
*G06F 9/50* (2006.01)

(52) U.S. Cl.
CPC .......... *G06F 9/5044* (2013.01); *G06F 9/5016* (2013.01); *G06F 2209/5011* (2013.01); *G06F 2209/5014* (2013.01); *G06F 2209/5019* (2013.01)

(58) Field of Classification Search
None
See application file for complete search history.

(56) References Cited

U.S. PATENT DOCUMENTS

| | | | |
|---|---|---|---|
| 7,454,516 B1 | 11/2008 | Weinert et al. | |
| 7,533,385 B1 | 5/2009 | Barnes | |
| 7,546,588 B2 | 6/2009 | Dickenson | |
| 7,962,609 B2 | 6/2011 | Koning et al. | |
| 8,032,634 B1 | 10/2011 | Eppstein et al. | |
| 8,209,515 B2 | 6/2012 | Schott | |
| 11,169,720 B1 * | 11/2021 | Al-Harbi | G06F 16/188 |
| 11,579,925 B2 * | 2/2023 | Duluk, Jr. | G06F 9/5044 |
| 12,120,040 B2 * | 10/2024 | Jackson | G06F 9/5061 |
| 2019/0258529 A1 * | 8/2019 | Moldvai | G06F 9/5016 |
| 2020/0174839 A1 * | 6/2020 | Venkadasamy | G06N 20/00 |
| 2021/0019160 A1 * | 1/2021 | Pan | G06F 9/5072 |

* cited by examiner

*Primary Examiner* — Bing Zhao
(74) *Attorney, Agent, or Firm* — EVERSHEDS SUTHERLAND (US) LLP

(57) ABSTRACT

A method of resource allocation is disclosed. A request from a user to allocate computing resources for specified compute processing is received. A server level allocation is performed, including by determining a full server reservation estimate corresponding to the request, wherein the full server reservation estimate comprises a count of how many servers are reserved for the specified compute processing. A virtual server pool is formed based at least in part on the full server reservation estimate. An allotment level allocation is performed, including by assigning among the virtual server pool one or more allotments for the specified compute processing.

20 Claims, 7 Drawing Sheets

PHASED SERVER RESERVATION WITH A SERVER LEVEL ALLOCATION AND AN ALLOTMENT LEVEL ALLOCATION

BACKGROUND OF THE INVENTION

Capacity management is the process of allocating computing resources to a user to provide the desired level of service for the user. A capacity management system consolidates all capacity requests from different teams in the company and allocates resources according to these requests. Improved techniques of capacity management that meet each allocation request but at the same time use the minimal number of servers would be desirable.

BRIEF DESCRIPTION OF THE DRAWINGS

Various embodiments of the invention are disclosed in the following detailed description and the accompanying drawings.

DETAILED DESCRIPTION

Figures 1A, 1B:
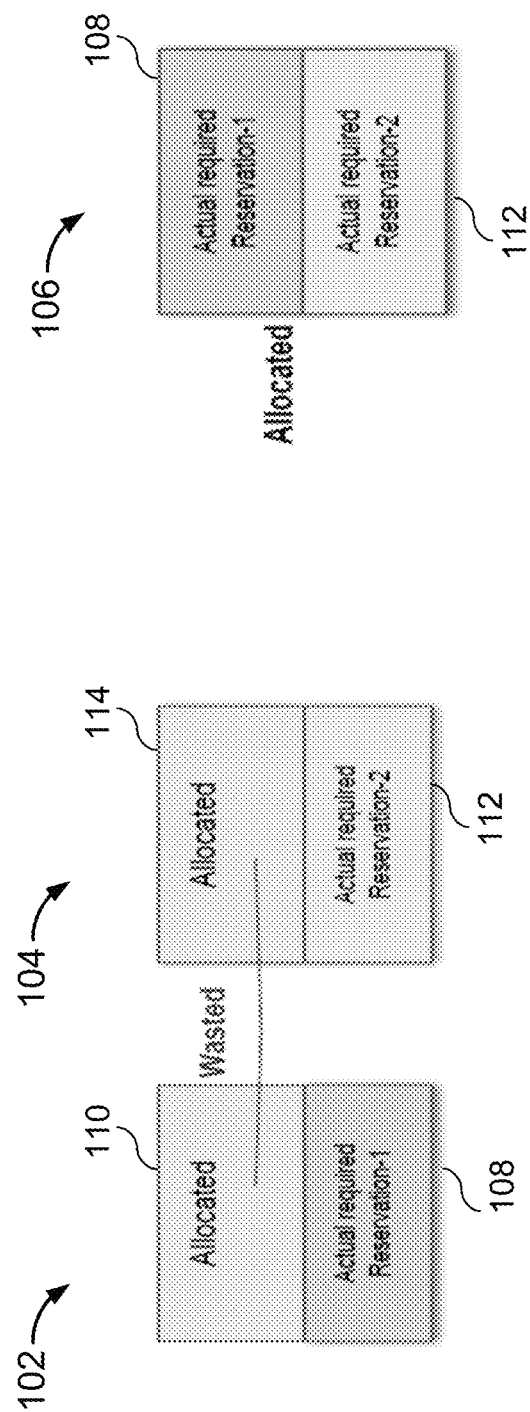
FIG. 1A and FIG. 1B illustrate that sharing a server across multiple stackable server reservations by different users requires fewer servers, thereby saving resources and money.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Resource allocation may be modeled as a mixed-integer programming (MIP) problem, which is a mathematical optimization in which some of the decision variables are constrained to be integer values (i.e., whole numbers such as 0, 1, 2, etc.) at the optimal solution. Typically, a mixed-integer programming problem may be solved using a third-party solver. Each resource request by a user may be modeled as a set of objectives or constraints for the solver.

For example, a resource allocation system may service two resource requests, with one user requesting for two T1 servers located in two different data centers and the other user requesting for one T10 server. T1 and T10 are different server types with different attributes. Suppose that the system has three T1 servers (S0-S2) and one T10 server (S3), and 50 and S1 belong to data center 1 (DC1), while S2 and S3 belong to data center 2 (DC2). Then a valid allocation is 50, S2 and S3. Note that the allocation of 50, S1, and S3 is not valid because the two T1 servers, 50 and S1, belong to the same data center. The granularity of the capacity allocation in the above example is one full server.

Although reserving the entire server works well for years, it has several drawbacks. Since the resources on one full server cannot be shared among multiple resource allocation requests by different users, the resource utilization on some servers may be low, which causes a waste of resources and money. This problem becomes especially serious when supply-chain problems (e.g., due to the pandemic) cause a shortage of new servers and therefore a significant capacity crunch in computer resources.

In some techniques, the system may allow stackable server reservations to improve resource utilization by enabling the sharing of a server across multiple stackable server reservations by different users. Non-stackable server reservations are reservations with a minimal granularity of the capacity allocation of a full server. Allowing stackable server reservations in a system means the minimal granularity of the capacity allocation is not a full server, but a piece or portion of a full server, which is referred to as an allotment. In other words, an allotment is a capacity allocation to a user that has a minimal granularity of a portion of a full server. An allotment may specify a combination of different resources associated with the portion of the full server allocated to a specific user, including the number of central processing units (CPUs), the amount of random access memory (RAM), the number of disks, and the like.

FIG. 1A and FIG. 1B illustrate that sharing a server across multiple stackable server reservations by different users requires fewer servers, thereby saving resources and money. FIG. 1A illustrates that one full server 102 is reserved by reservation-1 and another full server 104 is reserved by reservation-2. Reservation-1 requires only a portion of a full server, which is shown as the actual required resources for reservation-1 108, but also occupies a portion of the server that is allocated but wasted 110. Similarly, reservation-2 requires only a portion of a full server, which is shown as the actual required resources for reservation-2 112 but occupies a portion of the server that is allocated but wasted 114. As a result, two servers are needed to satisfy reservation-1 and reservation-2, with low resource usage on each of the servers.

FIG. 1B illustrates that one full server 106 is shared between reservation-1 and reservation-2. Reservation-1 requires only a portion of a full server, which is shown as the actual required resources for reservation-1 108, and the remaining portion of the full server is allocated to reservation-2, which is shown as the actual required resources for reservation-2 112.

Although allowing stackable server reservations is promising in mitigating capacity crunch, it may cause scalability problems because the number of objects that need to be considered by the solver increases significantly. For example, suppose each server may be divided into ten pieces, the solver has 10× more objects to handle than before. In addition, an upper bound of how many pieces a server may be split into may not be applicable in most cases because an upper bound is workload specific. Another problem introduced by stackable server reservations is that the change from full server allocations into allotments makes the existing codebase used by the system unusable because its logic assumes a full server as the minimal granularity.

To mitigate the scalability challenge associated with stackable server reservations, a phased solving technique for stackable server reservations may be used. The phased solving technique includes two phases, including a server level solving phase and an allotment level solving phase. Broadly, the server level solving phase allocates resources coarsely and makes sure the goals, including capacity, availability, or affinity, are met when considering all stackable server reservations as a whole. The allotment level solving phase fine tunes the allocation results obtained from the server level solving phase and places specific allotments onto the servers allocated by the server level solving phase. The goal for the allotment level solving phase is to make sure that the capacity requirement for each stackable server reservation is met.

In the present application, a method of resource allocation is disclosed. A request from a user to allocate computing resources for specified compute processing is received. A server level allocation is performed, including by determining a full server reservation estimate corresponding to the request, wherein the full server reservation estimate comprises a count of how many servers are reserved for the specified compute processing. A virtual server pool is formed based at least in part on the full server reservation estimate. An allotment level allocation is performed, including by assigning among the virtual server pool one or more allotments for the specified compute processing.

In the present application, a system of resource allocation is disclosed. A processor is configured to receive a request from a user to allocate computing resources for specified compute processing. The processor is configured to perform a server level allocation, including by determining a full server reservation estimate corresponding to the request, wherein the full server reservation estimate comprises a count of how many servers are reserved for the specified compute processing. The processor is configured to form a virtual server pool based at least in part on the full server reservation estimate. The processor is configured to perform an allotment level allocation, including by assigning among the virtual server pool one or more allotments for the specified compute processing. The system further comprises a memory coupled to the processor and configured to provide the processor with instructions.

In the present application, a computer program product embodied in a non-transitory computer readable medium and comprising computer instructions for resource allocation is disclosed. The computer program product embodied in the non-transitory computer readable medium comprises computer instructions for receiving a request from a user to allocate computing resources for specified compute processing. The computer program product embodied in the non-transitory computer readable medium comprises computer instructions for performing a server level allocation, including by determining a full server reservation estimate corresponding to the request, wherein the full server reservation estimate comprises a count of how many servers are reserved for the specified compute processing. The computer program product embodied in the non-transitory computer readable medium comprises computer instructions for forming a virtual server pool based at least in part on the full server reservation estimate. The computer program product embodied in the non-transitory computer readable medium comprises computer instructions for performing an allotment level allocation, including by assigning among the virtual server pool one or more allotments for the specified compute processing.

Figure 2:
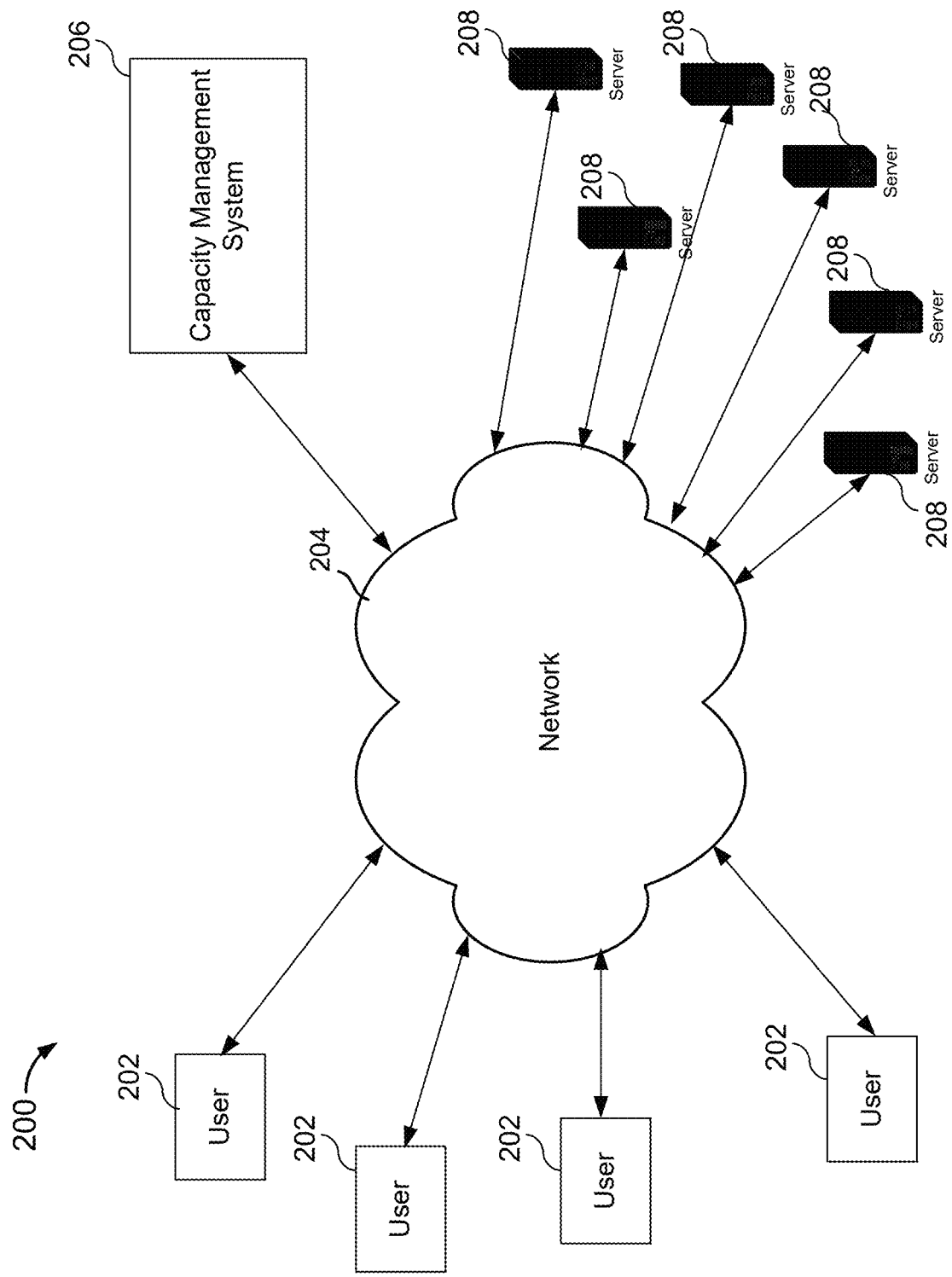
FIG. 2 illustrates an embodiment of an improved system 200 for capacity management.
Figure 3:
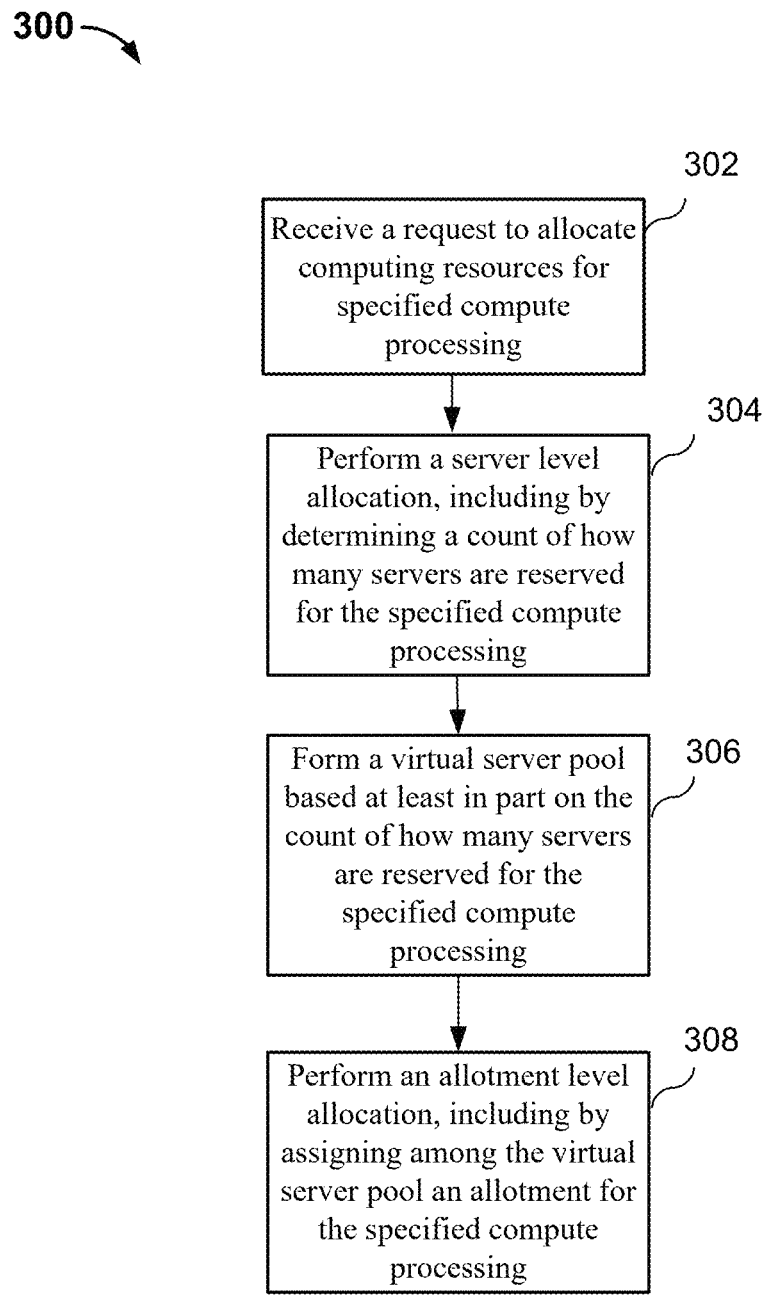
FIG. 3 illustrates an embodiment of an improved process 300 for capacity management.

FIG. 2 illustrates an embodiment of an improved system 200 for capacity management. FIG. 3 illustrates an embodiment of an improved process 300 for capacity management. In some embodiments, process 300 may be performed by system 200.

System 200 includes a plurality of users 202, a network 204, a capacity management system 206, and a plurality of servers 208. A user 202 may be a user using any devices, including laptop computers, desktop computers, tablet computers, smartphones, and other mobile devices. The users 202 are connected to capacity management system 206 through network 204. Network 204 may be any combination of public or private networks, including intranets, local area networks (LANs), wide area networks (WANs), radio access networks (RANs), Wi-Fi networks, the Internet, and the like. Capacity management system 206 may be connected to a plurality of servers 208 through network 204.

With reference to FIG. 3, at step 302, a request from a user to allocate computing resources for specified compute processing is received. Since capacity management system 206 enables the sharing of a server across multiple stackable server reservations by different users, the request to allocate computing resources for specified compute processing is also referred to as a stackable server reservation request. The reservation is referred to as the stackable server reservation, which is one or more allotments. An allotment is a capacity allocation to a user that has a minimal granularity of a portion of a full server. An allotment may specify a combination of different resources associated with the portion of the full server allocated to a specific user, including the number of central processing units (CPUs), the amount of random-access memory (RAM), the number of disks, and the like. In some embodiments, the amount of a particular resource in an allotment may be calculated such that it is proportional to the portion of the full server allocated to that allotment. For example, if the allotment is half of a full server, then the number of CPUs in the allotment is half of the total number of CPUs of the full server; the amount of RAM in the allotment is half of the total RAM of the full server; the number of disks in the allotment is half of the total number of disks of the full server, and so forth.

In some embodiments, capacity management system 206 includes a capacity management portal, which provides an interface between capacity management system 206 and the plurality of users 202. The capacity management portal may receive a request from a user 202 requesting the system to allocate computing resources for specified compute processing. The capacity management portal may additionally receive a plurality of parameters associated with the request to allocate computing resources. For example, a user 202 may specify that the user requires server usage, along with one or more requirements or preferences associated with the allocated resources.

The request from the user to allocate computing resources for specified compute processing specifies a memory shape size and a memory shape count associated with the one or more allotments for the specified compute processing, wherein the memory shape count specifies a number of requested units of memory with the memory shape size.

One input parameter is the memory shape size(S). Memories may have different memory shape types, such as a 4 gigabyte (4G) shape, an 8 gigabyte (8G) shape, and the like. For example, a 4G memory shape type has a memory shape size of 4G. And an 8G memory shape type has an 8G memory shape size. Another input is the memory shape count (N). The memory shape count specifies the number of requested units of the memory with the required memory shape size. For example, the user 202 may request two units of 4G shape memory, and the memory shape count (N) is two.

Another input is an allowed server subtype list. The request from the user to allocate computing resources for specified compute processing specifies an allowed server subtype list, wherein the allowed server subtype list specifies one or more subtypes of servers that are allowed in the one or more allotments for the specified compute processing. For example, the list specifies the subtypes of the servers that are allowed, and each of the allowed subtypes may have different attributes, such as having a certain type of central processing units (CPUs) or having a certain memory size. Another input is a required or preferred location of the allocated servers. For example, the input may specify that the allocated servers should be in a certain city, region, county, or state.

At step 304, a server level allocation is performed, including by determining a full server reservation estimate corresponding to the request, wherein the full server reservation estimate comprises a count of how many servers are reserved for the specified compute processing. The server level allocation phase and the allotment level allocation phase are cascaded together. The server level allocation phase is the first phase, followed by the allotment level allocation phase. For each stackable server reservation request, the number of full servers reserved for the stackable server reservation request is estimated first. This converts the stackable server reservation into a full server reservation estimate.

Figure 4:
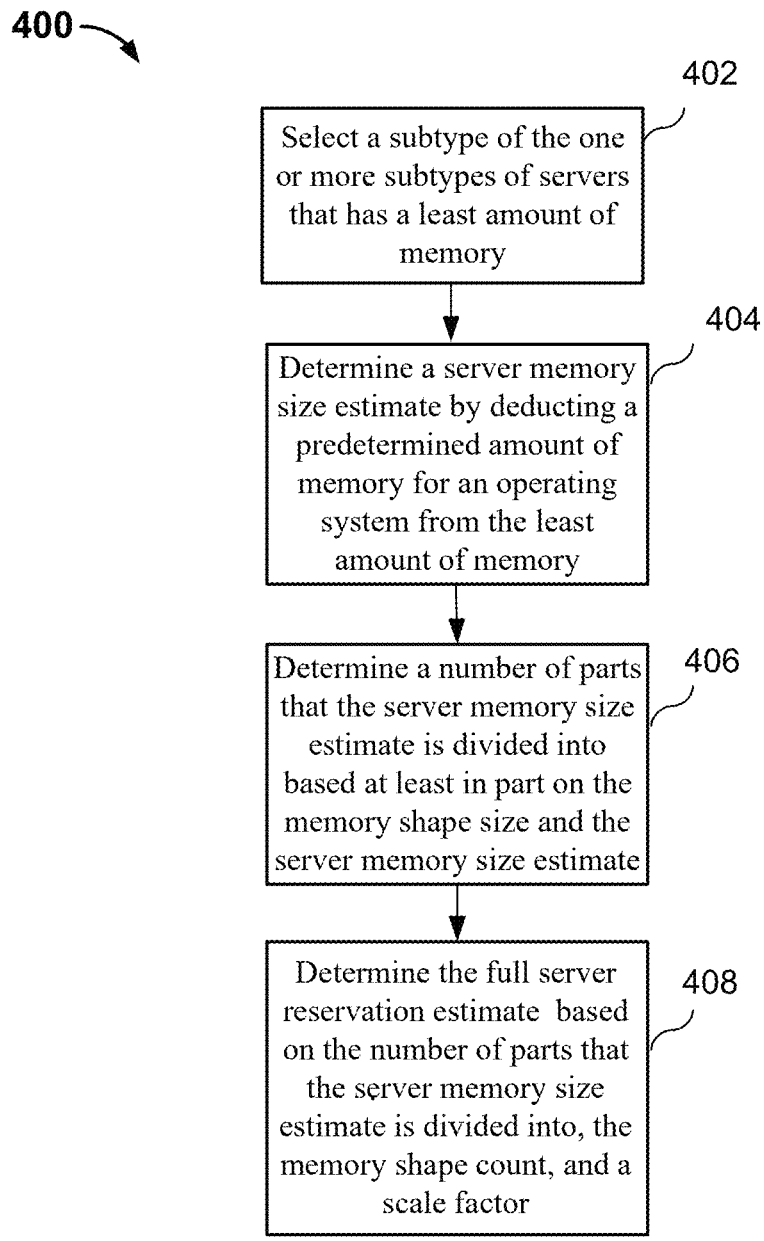
FIG. 4 illustrates an exemplary process 400 for determining the full server reservation estimate.

FIG. 4 illustrates an exemplary process 400 for determining the full server reservation estimate. Process 400 may be performed at step 304 of process 300.

At step 402, a subtype of the one or more subtypes of servers that has the least amount of memory is selected. In some embodiments, to estimate the full server reservation estimate (E), a server subtype on the allowed server subtype list that has the least amount of memory is selected.

At step 404, a server memory size estimate (M) is determined by deducting a predetermined amount of memory for an operating system from the least amount of memory. A predetermined amount of memory for the operating system is deducted from the amount of memory of the selected server subtype.

At step 406, a number of parts that the server memory size estimate is divided into is determined based at least in part on the memory shape size and the server memory size estimate. In some embodiments the number of parts that the server memory size estimate is divided into may be calculated using the formula M/S, where S is the memory shape size, and M is the server memory size estimate.

At step 408, the full server reservation estimate is determined based on the number of parts that the server memory size estimate is divided into, the memory shape count, and a scale factor. Suppose that the user requests for N units of memory with the memory shape size of S, then the full server reservation estimate, E, is equal to N divided by the number of parts that the server memory size estimate is divided into, then multiplied by a scale factor, and then converted to an integer (e.g., by performing a ceiling operation):

$$E=\text{ceiling}(N*(S/M)*(1+R)) \quad \text{Equation 1}$$

where (1+R) is a scale factor and
R is a percentage rate

The scale factor has a value greater than one, and R is a percentage tax rate charged to the user. For example, R may be 5% to 10%. Therefore, the full server reservation estimate (E) is determined at least in part based on a scale factor that is greater than one, and wherein the scale factor is based on a tax percentage rate, and wherein the tax percentage rate has a range between five percent and ten percent. The purpose of the scale factor is to maintain the virtual server pool (described below) in a good condition by reducing the amount of overhead caused by fragmentation.

The purpose of selecting the server subtype on the allowed server subtype list that has the least amount of memory in the above calculation is to ensure that the full server reservation estimate is an overestimate of the number of full servers needed. The advantage is that it can prevent the situation of not having enough servers and memory for allocating the allotments.

At step 306, a virtual server pool is formed based at least in part on the full server reservation estimate. In some embodiments, after the full server reservation estimate is determined at step 304, this full server reservation estimate corresponding to the request is combined with other full server reservation estimates (including other stackable reservations and non-stackable reservations) to be solved together by a solver to determine the number of servers forming the virtual server pool. In other words, the full server reservation estimate and the other full server reservation estimates are part of a set of objectives or constraints for the solver. After the solve is completed, the full servers that are allocated to all the stackable server reservations are determined and carved out from the rest to form a virtual server pool for the allotment phase.

Figure 5:
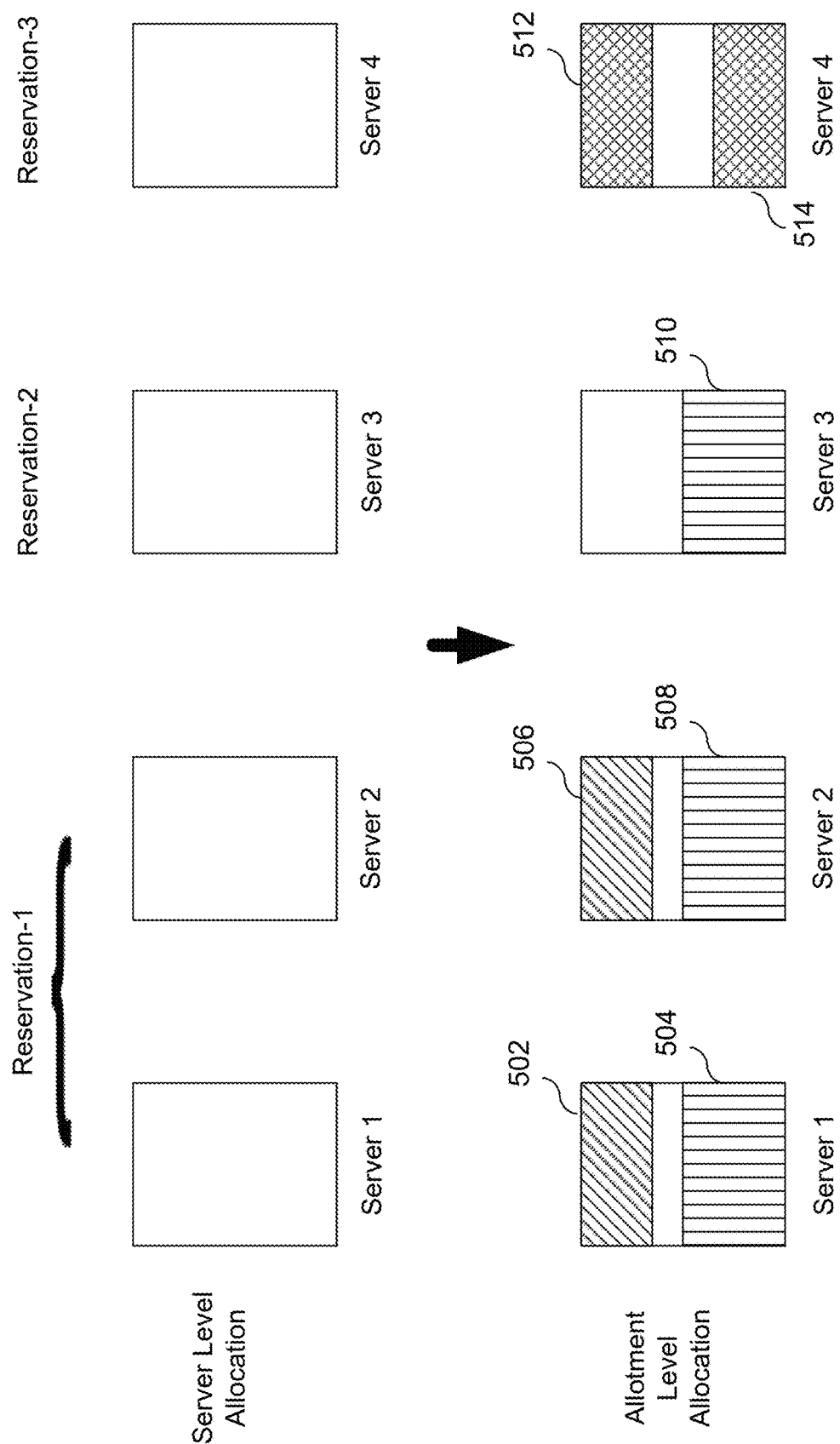
FIG. 5 illustrates one example of the server level allocation and allotment level allocation for three server reservations.

FIG. 5 illustrates one example of the server level allocation and allotment level allocation for three server reservations. In this example, Reservation-1 requests for three units of memory with the memory shape equal to one-half of a Type A server, where the Type A server is the allowed subtype. Using Equation 1 above, the full server reservation estimate for Reservation-1 is equal to two servers, assuming a tax rate of 10%. Therefore, at the server level allocation phase, two servers are reserved. Reservation-2 requests for two units of memory with the memory shape equal to one-third of a Type A server, where the Type A server is the allowed subtype. Using Equation 1 above, the full server reservation estimate for Reservation-2 is equal to one server, assuming a tax rate of 10%. Therefore, at the server level allocation phase, one server is reserved. Reservation-3 requests for two units of memory with the memory shape equal to one-third of a Type B server, where the Type B server is the allowed subtype. Using Equation 1 above, the full server reservation estimate for Reservation-3 is equal to one server, assuming a tax rate of 10%. Since Reservation-1 and Reservation-2 request for Type A servers only and Reservation-3 requests for Type B servers only, Reservation-1 and Reservation-2 may share three servers together, while Reservation-3 may not share its server with other reservations. The virtual server pool for Reservation-1 and Reservation-2 in this example includes three servers, Server 1, Server 2, and Server 3.

In some embodiments, after the full server reservation estimate is determined at step 304, the full server reservation estimate is combined with other full server reservation estimates (including other stackable reservations and non-stackable reservations) and a plurality of additional buffer servers to be solved together by a solver. The full server reservation estimate corresponding to the request, other full server reservation estimates corresponding to other requests to allocate computing resources for specified compute processing, and a predetermined number of buffer servers are combined to determine a number of servers forming the virtual server pool. The buffer servers are added to improve the availability of the capacity management system, as will be described in greater detail below. After the solve is completed, the full servers that are allocated to all the stackable server reservations are determined and carved out from the rest to form a virtual server pool for the allotment phase.

Figure 6:
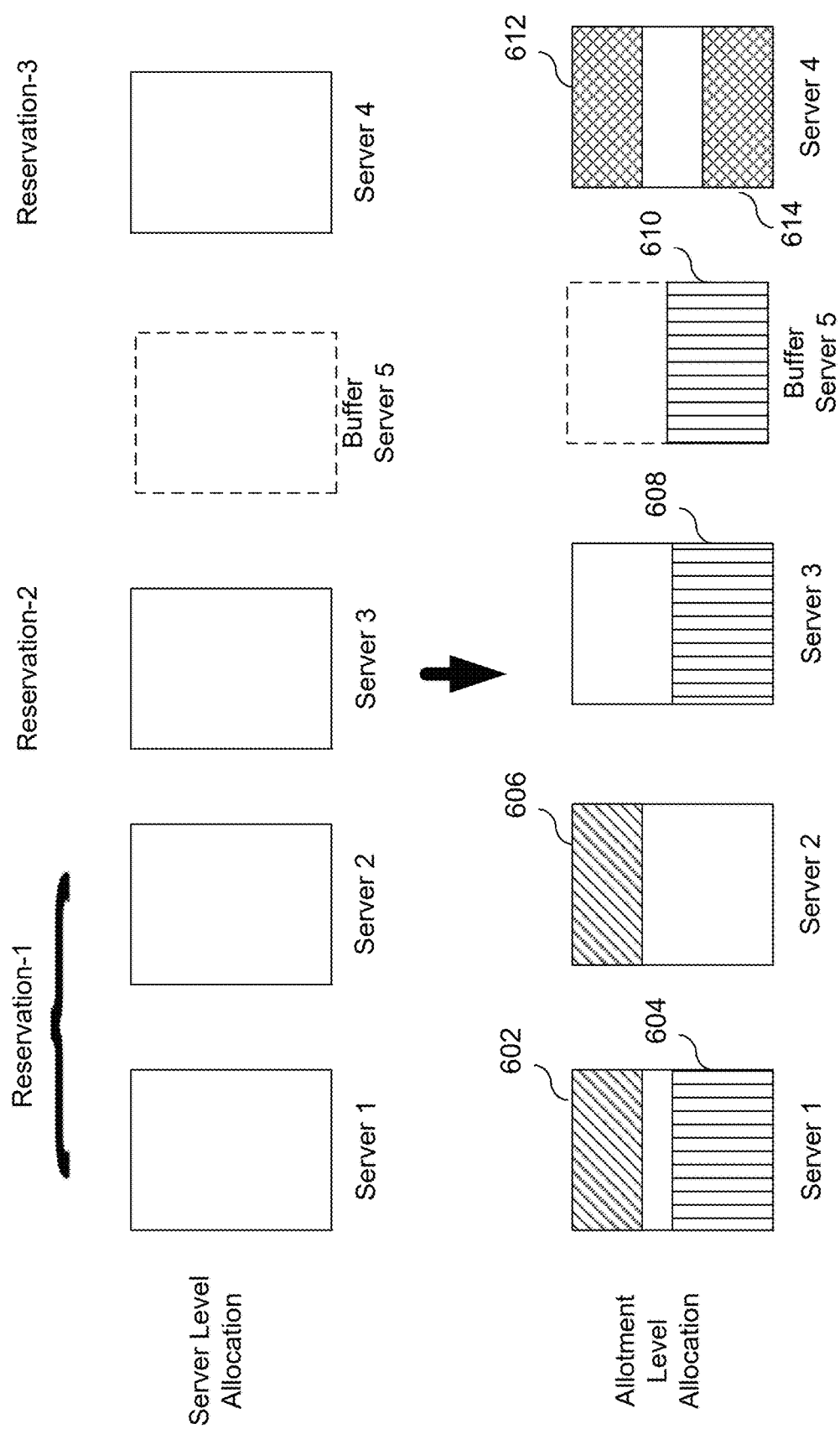
FIG. 6 illustrates one example of the server level allocation and allotment level allocation for three server reservations when buffer servers are used to improve the availability of the capacity management system.

FIG. 6 illustrates one example of the server level allocation and allotment level allocation for three server reservations when buffer servers are used to improve the availability of the capacity management system. In this example, Reservation-1 requests for three units of memory with the memory shape equal to one-half of a Type A server, where the Type A server is the allowed subtype. Using Equation 1 above, the full server reservation estimate for Reservation-1 is equal to two servers, assuming a tax rate of 10%. Therefore, at the server level allocation phase, two servers are reserved. Reservation-2 requests for two units of memory with the memory shape equal to one-third of a Type A server, where the Type A server is the allowed subtype. Using Equation 1 above, the full server reservation estimate for Reservation-2 is equal to one server, assuming a tax rate of 10%. Therefore, at the server level allocation phase, one server is reserved. Reservation-3 requests for two units of memory with the memory shape equal to one-third of a Type B server, where the Type B server is the allowed subtype. Using Equation 1 above, the full server reservation estimate for Reservation-3 is equal to one server, assuming a tax rate of 10%. One additional Type A server is added as a buffer server (Buffer Server 5) to improve the availability of the capacity management system. Since Reservation-1 and Reservation-2 request for Type A servers only and Reservation-3 requests for Type B servers only, Reservation-1 and Reservation-2 may share four servers together, while Reservation-3 may not share its server with other reservations. The virtual server pool for Reservation-1 and Reservation-2 in this example includes four servers, Server 1, Server 2, Server 3, and Buffer Server 5.

At step 308, an allotment level allocation is performed, including by assigning among the virtual server pool one or more allotments for the specified compute processing. The request from the user to allocate computing resources for specified compute processing specifies that an allotment of the one or more allotments for the specified compute processing has a minimal granularity of a portion of a full server. At the allotment level allocation, capacity, availability, and affinity goals are met by adding different constraints or objectives (e.g., memory shape or other allotment-based constraints) into the solver.

Regarding the affinity goal, if a user is previously allocated an allotment on a particular server, then in a new run, the system should try to allocate the same allotment to that user. The advantage is that the jobs or processes of the user do not need to be stopped and then restarted. The server that has been previously allocated to a user and has data for that user may be reused for another reservation by the same user. The solver is configured to perform the allotment level allocation such that a previous allotment to the user is assigned to the user.

Availability is the ability of a server to be in a state to perform a required function at a given instant of time or at any instant of time within a given time interval. For example, from the user's point of view, availability over a specified time interval is the percentage of that interval during which the system was available for normal use. Regarding the availability goal, the allotments allocated to a user should be spread out evenly onto multiple servers. The advantage is that in case of a server failure event, not all the jobs of the user are affected. The virtual server pool may include a list of predefined buffer servers, such that the allotments may be spread out onto multiple servers. For example, the virtual server pool shown in FIG. 5 does not include any predefined buffer servers, whereas the virtual server pool shown in FIG. 6 includes an additional predefined buffer server for spreading the allotments more evenly onto multiple servers.

With reference to FIG. 5, the virtual server pool for Reservation-1 and Reservation-2 in this example includes three servers, Server 1, Server 2, and Server 3, without any predefined buffer server. Reservation-1 requests for three units of memory with the memory shape equal to one-half of a Type A server. At the allotment level solving phase, the three allotments include an allotment 504 on Server 1, an allotment 508 on Server 2, and an allotment 510 on Server 3. Reservation-2 requests for two units of memory with the memory shape equal to one-third of a Type A server. At the allotment level solving phase, the two allotments include an allotment 502 on Server 1 and an allotment 506 on Server 2. Reservation-3 requests for two units of memory with the memory shape equal to one-third of a Type B server. At the allotment level solving phase, the two allotments include allotments 512 and 514. Reservation-3 does not share its server with other reservations.

With reference to FIG. 6, the virtual server pool for Reservation-1 and Reservation-2 in this example includes four servers, Server 1, Server 2, Server 3, and Buffer Server 5. Reservation-1 requests for three units of memory with the memory shape equal to one-half of a Type A server. At the allotment level solving phase, the three allotments include an allotment 604 on Server 1, an allotment 608 on Server 3, and an allotment 610 on Buffer Server 5, which is a predefined buffer server. Reservation-2 requests for two units of memory with the memory shape equal to one-third of a Type A server. At the allotment level solving phase, the two allotments include an allotment 602 on Server 1 and an allotment 606 on Server 2. Reservation-3 requests for two units of memory with the memory shape equal to one-third of a Type B server. At the allotment level solving phase, the two allotments include allotments 612 and 614. Reservation-3 does not share Server 4 with other reservations.

To further improve the scalability, server parts abstraction may be introduced. Using server parts abstraction, servers are treated the same in terms of how many parts the servers could be divided into. For example, a stackable server reservation requests for 4G memory shapes and the allowed server subtype list includes both 32G servers and 64G servers. Without server parts abstraction, a 32G server may hold 8 parts, and a 64G server may hold 16 parts. With server parts abstraction, a 32G server and a 64G server are treated the same, and each may be divided into 8 pieces. This server parts abstraction technique ensures good performance even when there are a large number of stackable server reservations in the pool because the solver is easier to find a feasible solution.

The phased server reservation framework mitigated the solver scalability problem by solving the allocation problem of stackable server reservations in two steps. First, how many full servers are required is estimated in the first phase, and then in the second phase, specific allotments are placed onto these servers. Because not all reservations are stackable server reservations and only the servers reserved for stackable server reservations need to be divided into smaller pieces, not all of the servers are divided into smaller pieces. In addition, the server parts abstraction technique ensures that the performance is not compromised even when there are a large number of stackable server reservations.

Figure 7:
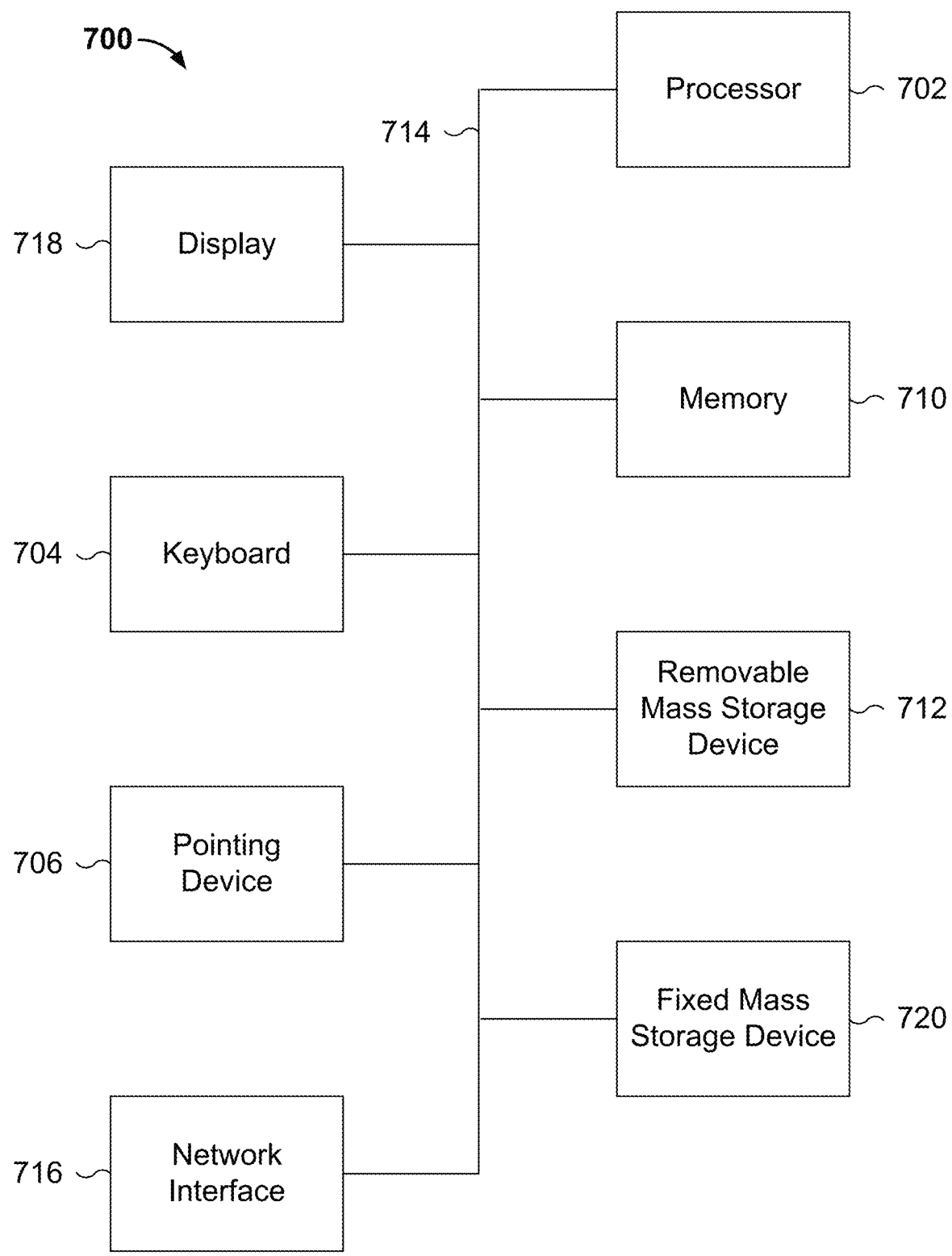
FIG. 7 is a functional diagram illustrating a programmed computer system for executing some of the processes in accordance with some embodiments.

FIG. 7 is a functional diagram illustrating a programmed computer system for executing some of the processes in accordance with some embodiments. As will be apparent, other computer system architectures and configurations can be used as well. Computer system 700, which includes various subsystems as described below, includes at least one microprocessor subsystem (also referred to as a processor or a central processing unit (CPU)) 702. For example, processor 702 can be implemented by a single-chip processor or by multiple processors. In some embodiments, processor 702 is a general purpose digital processor that controls the operation of the computer system 700. Using instructions retrieved from memory 710, the processor 702 controls the reception and manipulation of input data, and the output and display of data on output devices (e.g., display 718). In some embodiments, processor 702 includes and/or is used to execute/perform processes 300 and 400 described above with respect to FIGS. 3 and 4.

Processor 702 is coupled bi-directionally with memory 710, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 702. Also as is well known in the art, primary storage typically includes basic operating instructions, program code, data and objects used by the processor 702 to perform its functions (e.g., programmed instructions). For example, memory 710 can include any suitable computer-readable storage media, described below, depending on whether, for example, data access needs to be bi-directional or uni-directional. For example, processor 702 can also directly and very rapidly retrieve and store frequently needed data in a cache memory (not shown).

A removable mass storage device 712 provides additional data storage capacity for the computer system 700 and is coupled either bi-directionally (read/write) or uni-directionally (read only) to processor 702. For example, storage 712 can also include computer-readable media such as magnetic tape, flash memory, PC-CARDS, portable mass storage devices, holographic storage devices, and other storage devices. A fixed mass storage 720 can also, for example, provide additional data storage capacity. The most common example of mass storage 720 is a hard disk drive. Mass storage 712, 720 generally store additional programming instructions, data, and the like that typically are not in active use by the processor 702. It will be appreciated that the information retained within mass storage 712 and 720 can be incorporated, if needed, in standard fashion as part of memory 710 (e.g., RAM) as virtual memory.

In addition to providing processor 702 access to storage subsystems, bus 714 can also be used to provide access to other subsystems and devices. As shown, these can include a display monitor 718, a network interface 716, a keyboard 704, and a pointing device 706, as well as an auxiliary input/output device interface, a sound card, speakers, and other subsystems as needed. For example, the pointing device 706 can be a mouse, stylus, track ball, or tablet, and is useful for interacting with a graphical user interface.

The network interface 716 allows processor 702 to be coupled to another computer, computer network, or telecommunications network using a network connection as shown. For example, through the network interface 716, the processor 702 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 702 can be used to connect the computer system 700 to an external network and transfer data according to standard protocols. For example, various process embodiments disclosed herein can be executed on processor 702 or can be performed across a network such as the Internet, intranet networks, or local area networks, in conjunction with a remote processor that shares a portion of the processing. Additional mass storage devices (not shown) can also be connected to processor 702 through network interface 716.

An auxiliary I/O device interface (not shown) can be used in conjunction with computer system 700. The auxiliary I/O device interface can include general and customized interfaces that allow the processor 702 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 7 is but an example of a computer system suitable for use with the various embodiments disclosed herein. Other computer systems suitable for such use can include additional or fewer subsystems. In addition, bus 714 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving a request from a user to allocate computing resources for specified compute processing;
   determining a full server reservation estimate corresponding to the request, wherein the full server reservation estimate comprises a count of how many servers are reserved for the specified compute processing, and wherein the full server reservation estimate is based at least in part on a scale factor that is greater than one, and wherein the scale factor is based on a tax percentage rate;
   forming a virtual server pool based at least in part on the full server reservation estimate;
   assigning among the virtual server pool one or more allotments for the specified compute processing, wherein the one or more allotments are separate less than full server portions of one or more servers in the virtual server pool, wherein the request from the user to allocate the computing resources for the specified compute processing specifies a memory shape size and a memory shape count associated with the one or more allotments for the specified compute processing; and
   allocating the one or more allotments for the request.

2. The method of claim 1, wherein the request from the user to allocate the computing resources for the specified compute processing specifies that an allotment of the one or more allotments for the specified compute processing has a granularity of a portion of a full server.

3. The method of claim 1, wherein the memory shape count specifies a number of requested units of memory with the memory shape size.

4. The method of claim 3, wherein the request from the user to allocate the computing resources for the specified compute processing specifies an allowed server subtype list, wherein the allowed server subtype list specifies one or more subtypes of servers that are allowed in the one or more allotments for the specified compute processing.

5. The method of claim 4, wherein the determining of the full server reservation estimate corresponding to the request comprises:
   selecting a subtype of the one or more subtypes of servers that has a least amount of memory among the one or more subtypes of servers.

6. The method of claim 5, wherein the determining of the full server reservation estimate corresponding to the request comprises:
   determining a server memory size estimate by deducting a predetermined amount of memory for an operating system from the least amount of memory.

7. The method of claim 6, wherein the determining of the full server reservation estimate corresponding to the request comprises:
   determining a number of parts that the server memory size estimate is divided into based at least in part on the memory shape size and the server memory size estimate.

8. The method of claim 7, wherein the determining of the full server reservation estimate corresponding to the request comprises:
   determining the full server reservation estimate at least in part based on the number of parts that the server memory size estimate is divided into and the memory shape count.

9. The method of claim 1, wherein the tax percentage rate has a range between five percent and ten percent.

10. The method of claim 1, wherein the forming of the virtual server pool based at least in part on the full server reservation estimate comprises:
    combining the full server reservation estimate corresponding to the request with one or more other full server reservation estimates corresponding to one or more other requests to allocate the computing resources for the specified compute processing to determine a number of servers forming the virtual server pool.

11. The method of claim 1, wherein the forming of the virtual server pool based at least in part on the full server reservation estimate comprises:
    combining the full server reservation estimate corresponding to the request, one or more other full server reservation estimates corresponding to one or more other requests to allocate the computing resources for the specified compute processing, and a predetermined number of buffer servers to determine a number of servers forming the virtual server pool.

12. The method of claim 1, further comprising:
    configuring a solver performing an allotment level allocation such that a previous allotment to the user is assigned to the user.

13. A system, comprising:
    one or more processors configured to:
        receive a request from a user to allocate computing resources for specified compute processing;
        determine a full server reservation estimate corresponding to the request, wherein the full server reservation estimate comprises a count of how many servers are reserved for the specified compute processing, and wherein the full server reservation estimate is based at least in part on a scale factor that is greater than one, and wherein the scale factor is based on a tax percentage rate;
        form a virtual server pool based at least in part on the full server reservation estimate;
        assigning among the virtual server pool one or more allotments for the specified compute processing, wherein the one or more allotments is a are separate less than full server portions of one or more servers in the virtual server pool, wherein the request from the user to allocate the computing resources for the specified compute processing specifies a memory shape size and a memory shape count associated with the one or more allotments for the specified compute processing; and
        allocate the one or more allotments for the request; and
    memory coupled to at least one of the one or more processors and configured to provide the at least one of the one or more processors with instructions.

14. The system of claim 13, wherein the request from the user to allocate the computing resources for the specified compute processing specifies that an allotment of the one or more allotments for the specified compute processing has a granularity of a portion of a full server.

15. The system of claim 13, wherein the memory shape count specifies a number of requested units of memory with the memory shape size.

16. The system of claim 13, wherein being configured to form the virtual server pool based at least in part on the full server reservation estimate comprises being configured to:
    combine the full server reservation estimate corresponding to the request with one or more other full server reservation estimates corresponding to one or more other requests to allocate the computing resources for the specified compute processing to determine a number of servers forming the virtual server pool.

17. A computer program product embodied in a non-transitory computer readable medium and comprising computer instructions for:
    receiving a request from a user to allocate computing resources for specified compute processing;
    determining a full server reservation estimate corresponding to the request, wherein the full server reservation estimate comprises a count of how many servers are reserved for the specified compute processing, and wherein the full server reservation estimate is based at least in part on a scale factor that is greater than one, and wherein the scale factor is based on a tax percentage rate;
    forming a virtual server pool based at least in part on the full server reservation estimate;
    assigning among the virtual server pool one or more allotments for the specified compute processing, wherein the one or more allotments is a are separate less than full server portions of one or more servers in the virtual server pool, wherein the request from the user to allocate the computing resources for the specified compute processing specifies a memory shape size and a memory shape count associated with the one or more allotments for the specified compute processing; and
    allocating the one or more allotments for the request.

18. The computer program product of claim 17, wherein the request from the user to allocate the computing resources for the specified compute processing specifies that an allotment of the one or more allotments for the specified compute processing has a granularity of a portion of a full server.

19. The computer program product of claim 17, wherein the memory shape count specifies a number of requested units of memory with the memory shape size.

20. The computer program product of claim 17, wherein the forming of the virtual server pool based at least in part on the full server reservation estimate comprises:
    combining the full server reservation estimate corresponding to the request with one or more other full server reservation estimates corresponding to one or more other requests to allocate the computing resources for the specified compute processing to determine a number of servers forming the virtual server pool.

\* \* \* \* \*